United States Patent
Kanayama et al.

(10) Patent No.: US 10,753,450 B2
(45) Date of Patent: Aug. 25, 2020

(54) MAGNETIC TYPE ROTATION TRANSMITTING MECHANISM

(71) Applicant: HARMONIC DRIVE SYSTEMS INC., Shinagawa-ku, Tokyo (JP)

(72) Inventors: Naoki Kanayama, Azumino (JP); Toru Takeda, Azumino (JP)

(73) Assignee: HARMONIC DRIVE SYSTEMS INC., Shinagawa-ku, Tokyo (JP)

( * ) Notice: Subject to any disclaimer, the term of this patent is extended or adjusted under 35 U.S.C. 154(b) by 19 days.

(21) Appl. No.: 16/320,520

(22) PCT Filed: Sep. 30, 2016

(86) PCT No.: PCT/JP2016/079060
§ 371 (c)(1),
(2) Date: Jan. 25, 2019

(87) PCT Pub. No.: WO2018/061190
PCT Pub. Date: Apr. 5, 2018

(65) Prior Publication Data
US 2019/0234504 A1    Aug. 1, 2019

(51) Int. Cl.
H02K 49/10    (2006.01)
F16H 49/00    (2006.01)
H02K 49/00    (2006.01)

(52) U.S. Cl.
CPC .......... F16H 49/005 (2013.01); F16H 49/00 (2013.01); H02K 49/00 (2013.01); H02K 49/102 (2013.01); H02K 49/104 (2013.01)

(58) Field of Classification Search
CPC ...... H02K 49/102; H02K 49/00; H02K 51/00; H02K 7/003; H02K 7/1166; H01H 19/00;
(Continued)

(56) References Cited

U.S. PATENT DOCUMENTS

2007/0120432 A1* 5/2007 Vaden ............... F01B 3/007
                                                      310/80
2013/0099615 A1* 4/2013 Stewart ............ H02K 49/102
                                                     310/101

FOREIGN PATENT DOCUMENTS

JP    04105544 A    4/1992
JP    08332369 A    12/1996
(Continued)

OTHER PUBLICATIONS

International Search Report (PCT/ISA/210) dated Dec. 27, 2016, by the Japanese Patent Office as the International Searching Authority for International Application No. PCT/JP2016/079060.
(Continued)

*Primary Examiner* — Michael Andrews
(74) *Attorney, Agent, or Firm* — Buchanan Ingersoll & Rooney PC

(57) ABSTRACT

A magnetic type rotation transmitting mechanism has a rotating plate made of a magnetic material, and a magnet to which the rotational movement of the rotating plate is transmitted through a magnetic coupling between the magnet and the rotating plate. When the rotating plate is rotated, a plurality of oblique edge portions formed on the outer peripheral edge of the rotating plate rotate while sequentially passing through a magnet-facing area. The oblique edge portions move in the direction of the rotation centerline of the rotating plate, the rotation centerline being perpendicular to the center axis line of the magnet. The magnet is rotated about the center axis line by a magnetic force occurring between the magnet and the oblique edge portions passing through the magnet-facing area. It is possible to realize a small and compact mechanism for extracting rotation.

7 Claims, 12 Drawing Sheets

(58) Field of Classification Search
CPC .... H01H 19/005; H01H 19/36; F16H 49/005; F16H 49/00; F16H 49/001; F16H 49/003
USPC .......... 310/103, 105; 318/578; 200/12, 19.2, 200/19.36
See application file for complete search history.

(56) References Cited

FOREIGN PATENT DOCUMENTS

| | | | |
|---|---|---|---|
| JP | 2002116057 | A | 4/2002 |
| JP | 2010017658 | A | 1/2010 |
| JP | 2010270855 | A | 12/2010 |

OTHER PUBLICATIONS

Written Opinion (PCT/ISA/237) dated Dec. 27, 2016, by the Japanese Patent Office as the International Searching Authority for International Application No. PCT/JP2016/079060.

* cited by examiner

FIG. 4
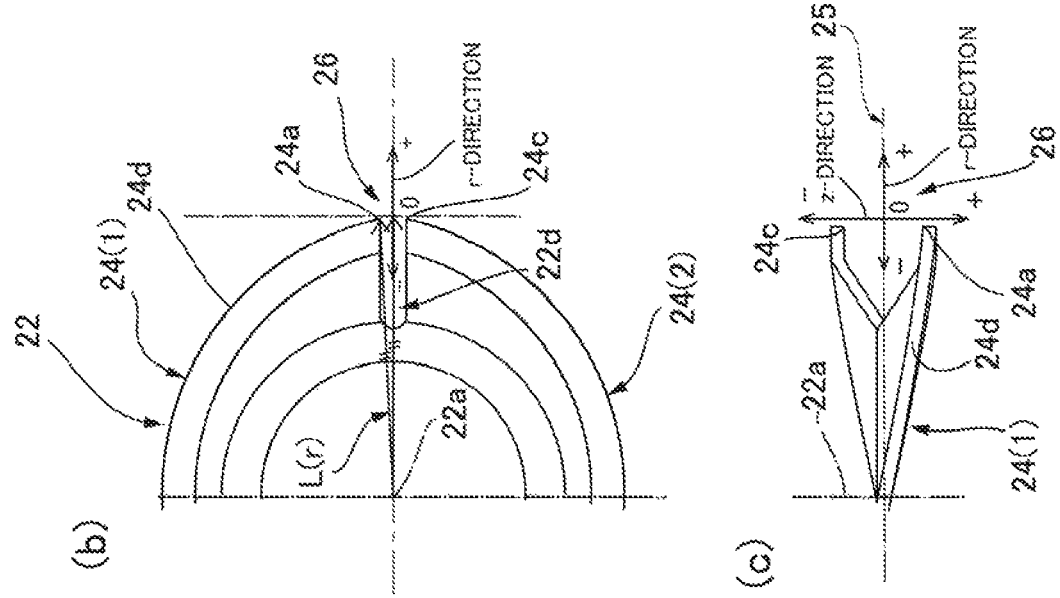
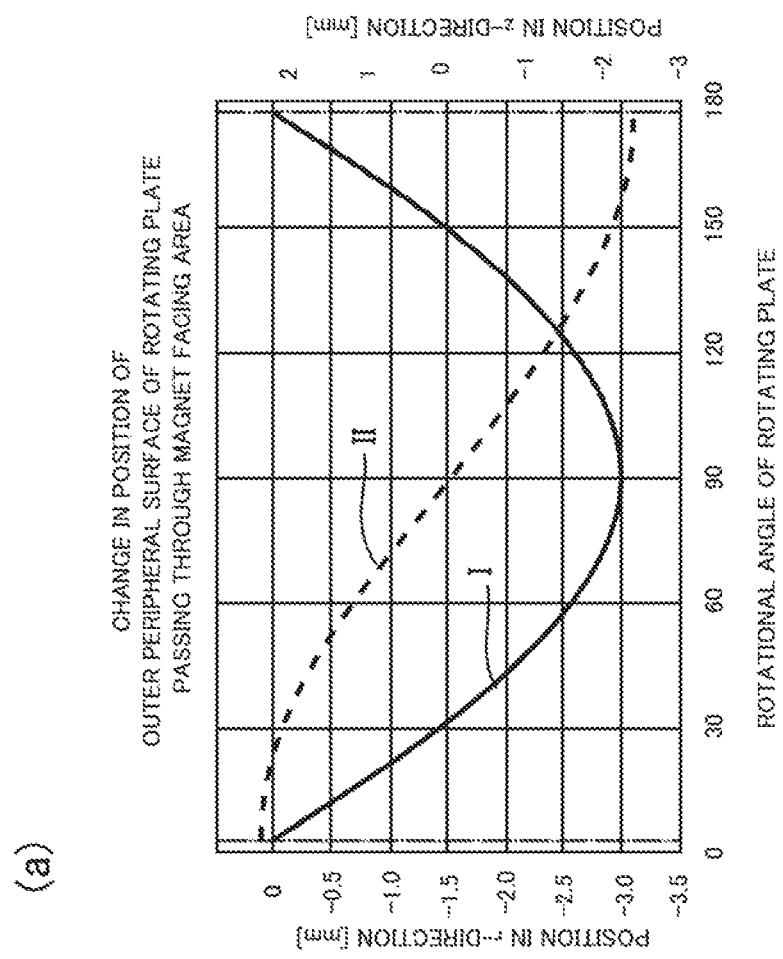

MAGNETIC TYPE ROTATION TRANSMITTING MECHANISM

TECHNICAL FIELD

The present invention relates to a magnetic type rotation transmitting mechanism for extracting rotation of a motor shaft or other rotating shaft, through magnetic coupling, to a magnet disposed on the outer peripheral side of the rotating shaft.

BACKGROUND ART

In a device for measuring rotational angles of a motor, the rotation of the motor shaft must be mechanically extracted to the device side. There are some cases in which the rotation cannot be extracted from a shaft coaxially coupled to the motor shaft via a coupling such as when the motor shaft is a hollow shaft having a hollow part in which another parts or cables are arranged.

In such cases, a gear is attached coaxially to the motor shaft and the rotation of the motor shaft is extracted from a transmission gear disposed to mesh with the gear, whereby the rotation of the motor shaft can be extracted to a position which is radially and outwardly apart from the rotation center of the motor shaft. When a small-diameter gear as the transmission gear for extracting rotation is disposed on an outward and radial side of the hollow motor shaft, the motor rotation is extracted in a state in which the rotational speed is increased. For example, in a case of a servomotor rotating at a rate of several thousand rotations per minute, a small-diameter transmission gear is rotated at a rate of several tens of thousand rotations per minute, which is not practical.

It is known as a mechanism for extracting the rotation of a rotating shaft to make use of magnetic coupling. Patent document 1 proposes an encoder device configured to extract the rotation of a motor shaft by making use of magnetic gears. Patent document 2 proposes a mechanism to extract rotation by making use of a magnetic type worm gear. In either case, a magnetic gear is provided, which is configured to be so magnetized as to correspond to each tooth of a spur gear or a worm gear.

PRIOR ART LITERATURE

Patent Document

Patent document 1: JP 2002-116057 A
Patent document 2: JP 2010-17658 A

SUMMARY OF THE INVENTION

Problems to be Solved by the Invention

An object of the present invention is to provide a magnetic type rotation transmitting mechanism, which does not require a large installation space on an radially outward side of a rotating shaft in such a case in which rotation is extracted from the rotating shaft such as a motor shaft to the radially outward side thereof.

Means of Solving the Problems

In order to solve the above problems, a magnetic type rotation transmitting mechanism according to the present invention has a disc-shape or toroidal rotating plate made of a magnetic material and a magnet to which the rotational movement of the rotating plate is transmitted through a magnetic coupling formed between the magnet and the rotating plate. The rotating plate has an outer peripheral edge part, the outer peripheral edge part being provided with an oblique edge portion separated at one place in the circumferential direction, or a plurality of oblique edge portions separated at equiangular intervals in the circumferential direction. The magnet is located at a position in an area including a passage route along which the oblique edge portion moves in accordance with rotation of the rotating plate, the position being at which the magnet faces the oblique edge portion with a prescribed gap.

The oblique edge portion of the rotating plate is inclined from one first end to the other second end thereof in the circumferential direction with respect to the direction of a rotation centerline of the rotating plate. Here, a plane is referred to as an orthogonal plane which is orthogonal to the rotation centerline and which passes through the center between the first and second ends of the oblique edge portion when viewed along the direction of the rotation centerline of the rotating plate. The magnet is disposed so that it can rotate about a center axis line located on the orthogonal plane. The magnet is either a magnet formed with a plurality of magnetic poles along a circumferential direction about the center axis line thereof or a magnet formed with a plurality of magnetic poles along the direction of the center axis line thereof.

When the rotating plate is rotated, the oblique edge portions formed on the outer peripheral edge thereof rotate and sequentially pass through the area (magnet facing area) where the oblique edge portions face the magnet. The magnet faces, with a prescribed gap, the oblique edge portions of the rotating plate which rotate to pass through the magnet facing area. The rotating plate and the magnet are in a magnetic coupling state in the magnet facing area.

In the magnet facing area, each oblique edge portion repeatedly moves by the same distance and in the same direction from one side to the other along the center axis line of the magnet in accordance with rotation of the rotating plate. The magnet is caused to rotate about the center axis line by a magnetic force generated between the magnet and the oblique edge portion passing through the magnet facing area by appropriately setting the distance by which the oblique edge portion moves.

As the magnet, it is possible to provide a cylindrical magnet which is formed with a plurality of magnetic poles in the circumferential direction about the center axis line thereof. In this case, when the oblique edge portion moves from one side to the other along the magnet center axis line (the orthogonal plane), the cylindrical magnet is caused to rotate about the center axis line in such a manner that the boundary between the adjacent magnetic poles on the outer peripheral surface thereof is maintained closest to the oblique edge portion of the rotating plate that passes through the magnet facing area with a prescribed gap.

It is preferable that the shape of the oblique edge portion of the rotating plate be determined so that the gap can be maintained constant between the oblique edge portion passing through the magnet facing area and the cylindrical magnet.

For that purpose, when the rotating plate rotates, the position of the oblique edge portion passing through the magnet facing area draws a curved moving locus along the outer peripheral surface of the cylindrical magnet toward the direction of the rotation centerline. The inclined shape of the oblique edge portion in the direction of the rotation centerline and the shape of the outer peripheral surface thereof are determined so that such a moving locus can be obtained.

For example, the inclined shape of the oblique edge portion is defined by a curved line. The shape of the outer peripheral surface of the oblique edge portion is defined by a curved line having a radius centered on the rotation centerline, in which the radius gradually decreases from the first end to the middle point located on the orthogonal plane between the first and second ends and gradually increases from the middle point to the second end.

As the cylindrical magnet, it is possible to provide one having such a dimension that can be disposed between the moving routes of the first and second ends of the oblique edge portion that passes through the magnet facing area. In this case, at least a part of the cylindrical magnet can be disposed within the outer diameter dimension of the rotating plate, and the installation space for the cylindrical magnet on the outer peripheral side of the rotating plate can be decreased.

As the magnet, it is also possible to provide a plate magnet formed with a plurality of magnetic poles in the direction of the center axis line thereof.

It is desirable in this case as well that the shape of the oblique edge portion of the rotating plate be determined so that the variation of the gap between the oblique portion and the plate magnet can be suppressed. For example, the shape of the outer peripheral surface of the oblique portion is defined by a true circle from the first end to the second end thereof, the true circle being centered on a position offset from the rotation centerline by a prescribed amount.

BRIEF DESCRIPTION OF THE DRAWINGS

FIG. 4 includes a graph and explanatory views, illustrating positional change of an oblique edge portion passing through a magnet facing area in accordance with rotation of a rotating plate;

MODE FOR CARRYING OUT THE INVENTION

Embodiments of a magnetic type rotation transmitting mechanism according to the present invention will be described with reference to the drawings. It is, however, noted that each embodiment described below illustrates an example of the present invention and that the present invention is not limited to the constitutions of these embodiments.

Embodiment 1

Figure 1:
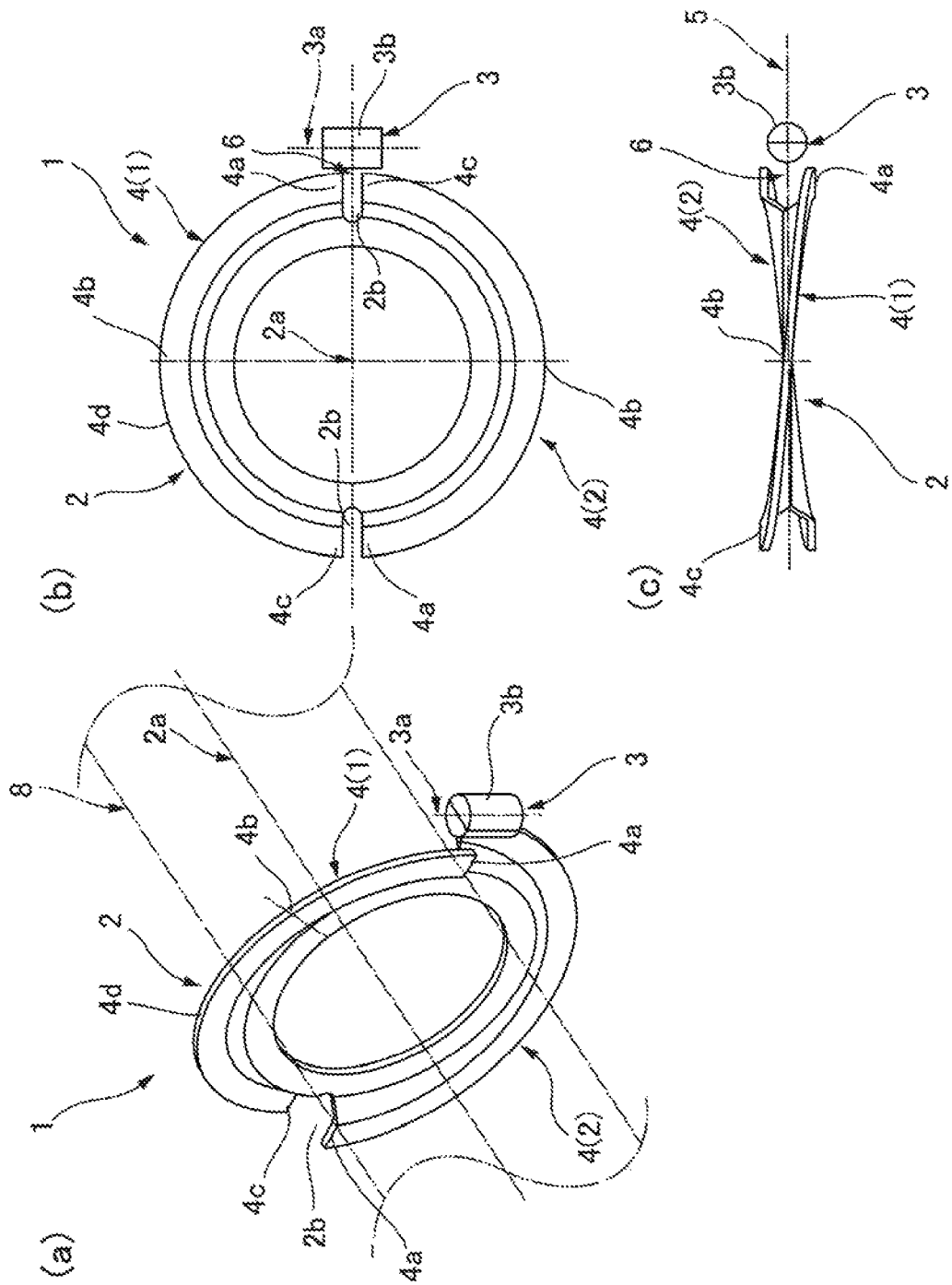
FIG. 1 includes a perspective view, a front view and a side view, illustrating a magnetic type rotation transmitting mechanism according to Embodiment 1 of the present invention.

FIG. 1 includes a perspective view, a front view and a side view, illustrating main portions of a magnetic type rotation transmitting mechanism according to Embodiment 1. The magnetic type rotation transmitting mechanism 1 has a toroidal rotating plate 2 made of a magnetic material and a cylindrical magnet 3. The rotating plate 2 is coaxially fixed, for example, to a hollow motor shaft 8 to rotate integrally therewith. The rotating plate 2 rotates about a rotation centerline 2$a$ that is the center axis line thereof. The rotational movement of the rotating plate 2 is transmitted through a magnetic coupling to the cylindrical magnet at a ratio of 1:1.

The rotating plate 2 is a sheet metal plate product, for example, and is formed on the outer peripheral edge thereof with a plurality of oblique edge portions separated at equiangular intervals along the circumferential direction. In this example, there are formed two oblique edge portions 4(1) and 4(2) with an angle of substantially 180 degrees by two separation grooves 2$b$ that cut the rotating plate 2 from the outer peripheral surface toward the radially inward direction with a constant width. The oblique edge portions 4(1) and 4(2) have the shapes that are rotational symmetry about the rotation centerline 2$a$.

A plane is referred to as an orthogonal plane 5 which is orthogonal to the rotation centerline 2$a$ and passes through the center position of the rotating plate 2 in the direction of the rotation centerline 2$a$ (in the thickness direction of the rotating plate 2). In this example, the oblique edge portions 4(1) and 4(2) are inclined in a curved fashion when viewed from the direction along the orthogonal plane 5. It is also possible that the oblique edge portions 4(1) and 4(2) be shaped to incline linearly.

The oblique edge portions 4(1) and 4(2) are respectively provided with one first end 4$a$ and the other second end 4$c$. The first end 4$a$ thereof is located on one side of the orthogonal plane 5 and is apart from the orthogonal plane 5 toward the one side thereof by a fixed distance. The second end 4$c$ is located on one side of the orthogonal plane 5 and is apart from the orthogonal plane 5 toward the other side thereof by the same distance. The midpoint 4$b$ between the first and second ends 4$a$ and 4$c$ is located on the orthogonal plane 5.

The oblique edge portions 4(1) and 4(2) are respectively provided with an outer peripheral surface 4$d$ having a contour defined by a circular arc, the circular arc being centered on the rotation centerline 2a when viewed from the direction along the rotation center line 2a.

The cylindrical magnet 3 is disposed so that it can rotate about the center axis line 3a thereof. The bearing portions of the cylindrical magnet 3 are omitted from the drawing. The cylindrical magnet 3 is formed with a plurality of magnetic poles at equiangular intervals about the center axis line 3a. In this example, a pair of magnetic poles are formed at an angular interval of 180 degrees. In FIG. 1, the solid lines, which are drawn on the outer peripheral surface 3b and both end faces of the cylindrical magnet 3, indicate boundaries between the magnetized N and S poles, but those lines are not actually appeared on the magnet. This is also applied in FIGS. 2 to 9.

The cylindrical magnet 3 is disposed at a position in an area including the passage route of the oblique edge portions 4(1) and 4(2) in accordance with rotation of the rotation plate 2, the position being at which the magnet faces the outer peripheral edge of the oblique edge portions 4(1) and 4(2) with a prescribed gap. The center axis line 3a of the cylindrical magnet 3 is located on the orthogonal plane 5 and extends in the tangential direction of the outer peripheral surface 4d of the oblique edge portion.

When the motor shaft 8 rotates, the rotating plate 2 is rotated together with the motor shaft 8. When the rotating plate 2 rotates, the oblique edge portions 4(1) and 4(2) formed on the outer peripheral edge part thereof rotate to sequentially pass through a magnet facing area 6 in which they face the cylindrical magnet 3 with a prescribed gap.

Figure 2:
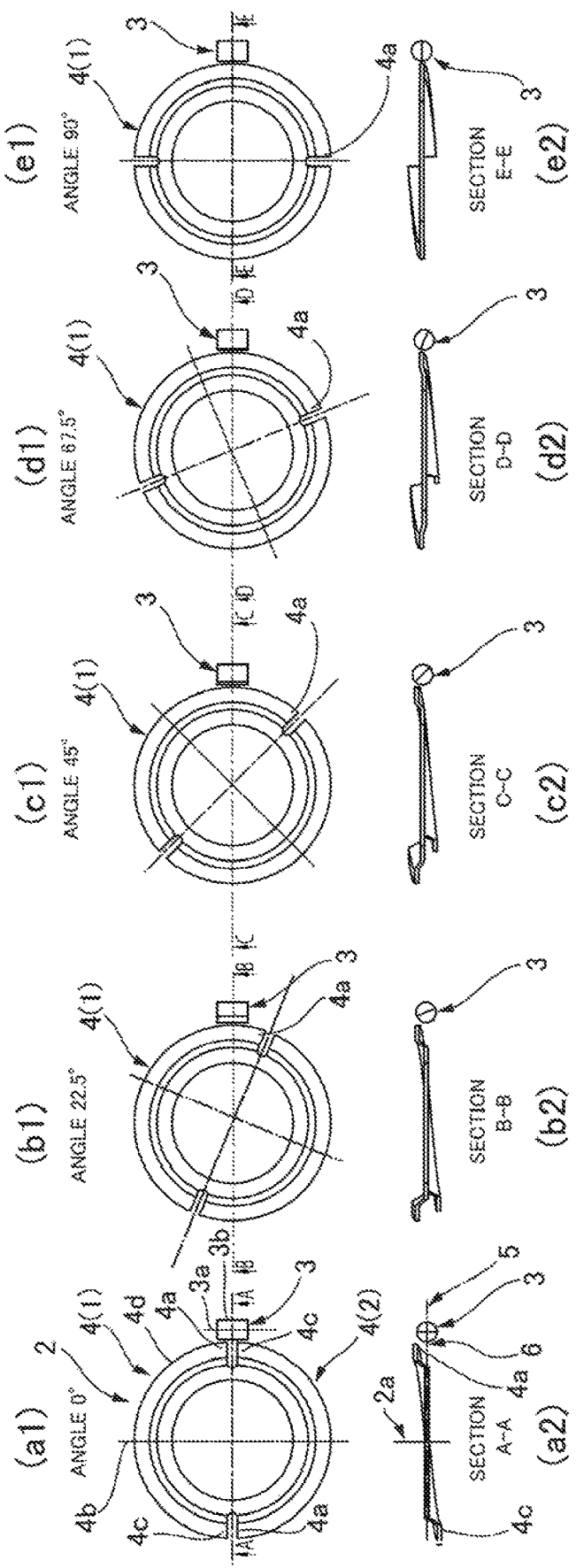
FIG. 2 includes explanatory views illustrating rotational states of a rotating plate and a cylindrical magnet in Embodiment 1.

FIG. 2 includes explanatory views illustrating rotational states of the oblique edge portions 4(1), 4(2) and the cylindrical magnet 3 in accordance with rotation of the rotating plate 2 in the magnetic type rotation transmitting mechanism 1.

FIGS. 2(a1) and 2(a2) indicate the rotational positions of the rotating plate 2 at an angle of 0 degree, from which the rotating plate 2 rotates clockwise. The first end 4a of the oblique edge portion 4(1) and the second end 4c of the oblique edge portion 4(2) of the rotating plate 2 are located in the magnet facing area 6 in the angular position of 0 degree as illustrated in FIGS. 2(a1) and 2(a2).

The outer peripheral surface 4d of each of the oblique edge portions 4(1) and 4(2) is a circular arc surface centered on the rotation centerline 2a. When viewed from the direction along the rotation centerline 2a, when the rotating plate 2 rotates, each part of the oblique edge portions 4(1) and 4(2) passes through the magnet facing area 6 in a state facing the outer peripheral surface 3b of the cylindrical magnet 3 with a prescribed gap as illustrated in FIGS. 2(a1) to 2(e1).

The oblique edge portions 4(1) and 4(2) are inclined in a curved fashion when viewed from the direction along the orthogonal plane 5. As shown in FIGS. 2(a2) to 2(e2), the positions of the oblique edge portions 4(1) and 4(2) passing through the magnet facing area 6 move in the direction of rotation centerline 2a of the rotating plate 2 in accordance with rotation of the rotating plate 2. Specifically, the oblique edge portions 4(1) and 4(2) move in a curved fashion toward the direction of the rotation centerline 2a of the rotating plate 2 from one side of the orthogonal plane 5 (the center axis line 3a of the cylindrical magnet 3) to the other side thereof. The direction of the rotation centerline 2a is the tangential direction of the outer peripheral surface 3b of the cylindrical magnet 3.

More specifically, when the rotating plate 2 rotates clockwise from the rotational state as illustrated in FIGS. 2(a1) and 2(a2), the oblique edge portion 4(1) passes through the magnet facing area 6 from the first end 4a toward the second end 4c thereof. In the state of FIGS. 2(a1) and 2(a2), the outer peripheral edge of the oblique edge portion 4(1) passing through the magnet facing 6 is located at one side of the orthogonal plane 5a and is furthest away from the one side thereof along the rotation centerline 2a.

In accordance with rotation of the rotating plate 5, the part of the oblique edge portion 4(1) passing through the magnet facing area 6 moves to the other side of the orthogonal plane 5 (the center axis line 3a) along the rotation centerline 2a as illustrated in FIGS. 2(b1), 2(b2) to FIGS. 2(e1), 2(e2). The midpoint 4b of the oblique side plate 4(1) in the circumferential direction is located on the orthogonal plane 5 at the position when the rotting plate 2 rotates by 90 degrees, as illustrated in FIGS. 2(e1) and 2(e2).

Thereafter, the position of the oblique edge portion 4(1) passing through the magnet facing area 6 moves gradually away from the orthogonal plane 5 toward the other side thereof. In a state when the second end 4c of the oblique edge portion 4(1) passes through the magnet facing area 6, the second end 4c thereof is located furthest away from the orthogonal plane 5 toward the other side thereof.

The cylindrical magnet 3 is caused to rotate by a magnetic force generated between the cylindrical magnet 3 and the oblique edge portions 4(1) passing through the magnet facing area 6. Specifically, the cylindrical magnet 3 rotates so that the magnet pole boundary appeared on the outer peripheral surface 3b of the cylindrical magnet 3 comes closest to the outer peripheral edge of the oblique edge portion 4(1) of the rotating plate 2. As a result, the cylindrical magnet 3 is rotated by an angle corresponding to the amount of one magnet pole when the oblique edge portion 4(1) has passed through the magnet facing area 6. In this example, the cylindrical magnet 3 makes a half rotation.

Next, the other oblique edge portion 4(2) moves to the same position as that of the oblique edge portion 4(1) illustrated in FIGS. 2(a1) and 2(a2). As the rotating plate 2 rotates, the position of the oblique edge portion 4(2) passing through the magnet facing area 6 moves in the same direction along the direction of the rotation centerline 2a (the tangential direction of the cylindrical magnet 3) as that of the oblique edge portion 4(1). This movement causes the cylindrical magnet 3 to make a further half rotation. In this way, the cylindrical magnet 3 magnetically coupled to the rotating plate 2 is made one rotation each time the rotating plate makes one rotation.

Embodiment 2

Figure 3:
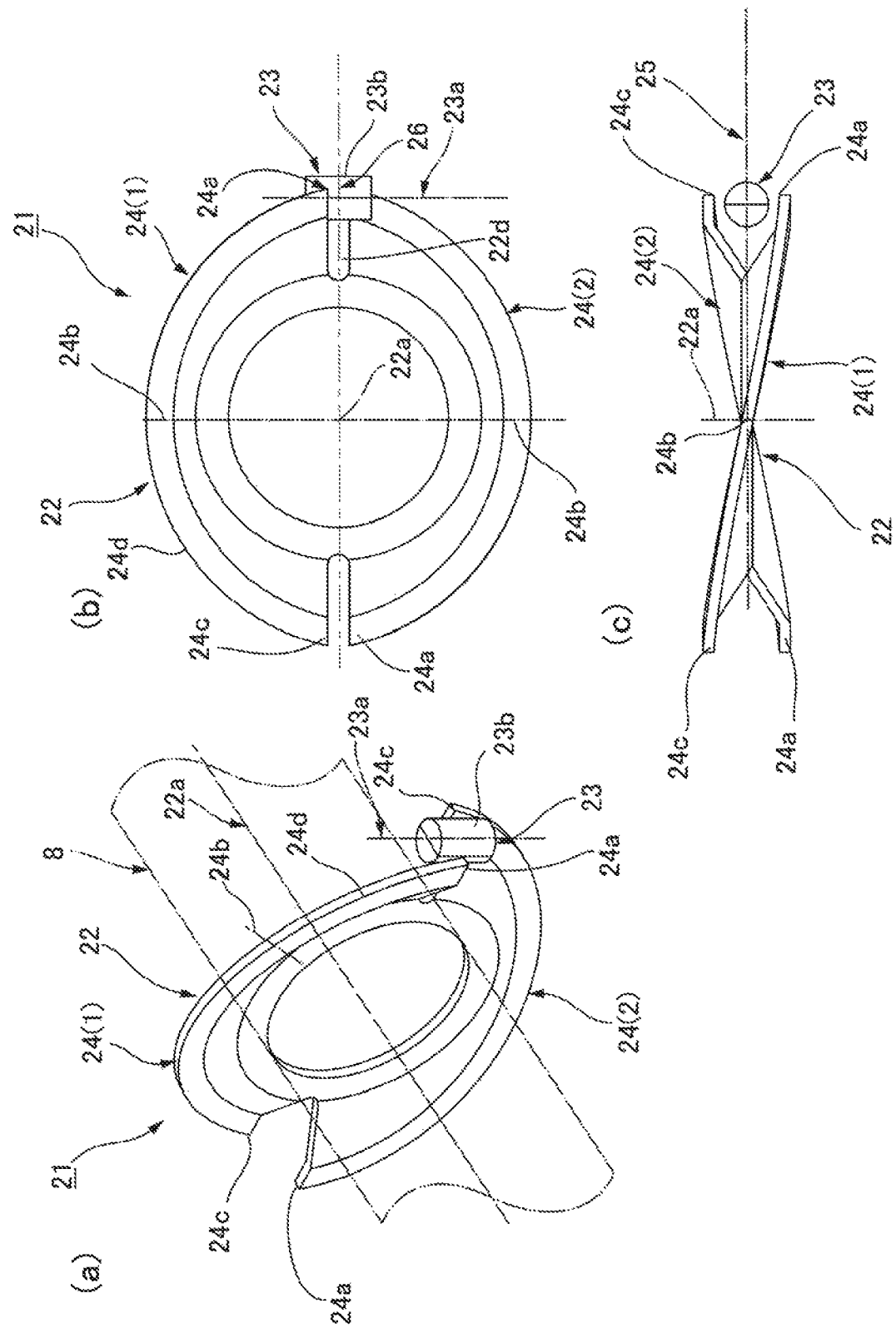
FIG. 3 includes a perspective view, a front view and a side view, illustrating a magnetic type rotation transmitting mechanism according to Embodiment 2 of the present invention.

FIG. 3 includes a perspective view, a front view and a side view, illustrating main portions of a magnetic type rotation transmitting mechanism according to Embodiment 2. The magnetic type rotation transmitting mechanism 21 has the same basic configuration as that of the magnetic type rotation transmitting mechanism 1 of Embodiment 1. The following description will be made mainly as to the differences from Embodiment 1.

The magnetic type rotation transmitting mechanism 21 is configured so that the position of oblique edge portions 24(1) and 24(2) passing through a magnet facing area 26 draws a curve-shaped moving locus in accordance with rotation of a rotating plate 22. The curve-shaped movement locus extends in the direction of the rotation centerline 22a along the outer peripheral surface 23b of a cylindrical magnet 23. The inclined shape of the oblique edge portions 24(1), 24(2) in the direction of the rotation centerline 22a and the shape of the outer peripheral surface thereof are determined as follows.

As can be seen from FIG. 3(c), each of the oblique edge portions 24(1), 24(2) is inclined in a curved fashion from the first end 24a to the second end 24c thereof when viewed from the direction along an orthogonal plane 25. The first end 24a is located at one side of the orthogonal plane 25 and is apart from the plane toward the one side by a constant distance, while the second end 24c is located at the other side of the orthogonal plane 25 and is apart from the plane toward the second side by the same distance. The midpoint 24b between the first end 24a and the second end 24c is located on the orthogonal plane 25.

The shape of the outer peripheral surface of the oblique edge portions 24(1), 24(2) is defined by a convex curve as can be seen from FIGS. 3(a) and 3(b). The radius of the convex curve centered on the rotation centerline 22a decreases from the first end 24a to the midpoint 24b and increases from the midpoint 24b to the second end 24c.

The cylindrical magnet 23 is magnetized to have two poles, whereby the magnetic pole boundary is formed at an angular interval of 180 degrees on the outer peripheral surface 23b about the center axis line 23a. The cylindrical magnet 23 has an outer-diameter dimension so as to be disposed between the moving routes of the first end 24a and the second end 24c of each of the oblique edge portions 24(1), 24(2) passing through the magnet facing area 26. In an example illustrated in FIG. 3, the cylindrical magnet 23 is disposed so that a part thereof is located within the maximum radius of the oblique edge portions 24(1), 24(2) (within the radius of the first and second ends 24a, 24c). FIG. 3 illustrates an example of relative positional relationship between the cylindrical magnet 23 and the rotating plate 22. The positional relationship between these is not limited to the illustrated example.

FIG. 4(a) is a graph illustrating change in r-directional position and z-directional position of the outer-peripheral-surface position of the rotating plate 22 passing through the magnet facing area 26 in accordance with rotation of the rotating plate 22.

As illustrated in FIGS. 4(b) and 4(c), an r-direction is the direction of the radial line of the rotating plate 22, the radial line being drawn in the direction orthogonal to the center axis line 23a of the cylindrical magnet 23 from the rotation center 22a of the rotating plate 22, and a z-direction is the direction of the center axis line 22a of the rotating plate 22. The outer-peripheral-surface position of the rotating plate 22, which passes through the magnet facing area 26, is a position on the outer peripheral surface 24d of the rotating plate 22 where the plane including the radial line or the r-direction and the center axis line 22a of the rotating plate 22 intersects. More specifically, the outer-peripheral-surface position is a position on the inner edge in the width direction of the outer peripheral surface 24d. In addition, an r-directional position is that of the outer-peripheral-surface position of the rotating plate 22 in the r-direction, and a x-directional position is that of the outer-peripheral-surface position of the rotating plate 22 in the center axis line 22a of the rotating plate 22.

In the graph in FIG. 4(a), the horizontal axis indicates a rotational position of the rotating plate 22. The rotational position illustrated in FIG. 4(b) is a position in which the rotational angle of the rotating plate 22 is zero and the centerline of the separation groove 22d is in coincidence with the radial line indicating the r-direction, the oblique edge portions 24(1) and 24(2) being separated by the separation groove 22d. The rotational position where the rotational angle is 180 degree is a position in which the rotating plate 22 rotates clockwise by an angle of 180 degrees from the rotational position illustrated in FIG. 3(b).

The vertical axis at the left side of the graph indicates the r-directional position. The zero position of the r-directional position is a position when the first end 24a of the outer peripheral surface 24d of the rotating plate 22 has just passed through the magnet facing area 26 as illustrated in FIGS. 4(b) and 4(c). In these drawings, positive direction is a direction to go away from the center axis line 22a of the rotating plate 22 and negative direction is a direction to approach the center axis line 22a.

The vertical axis at the right side of the graph indicates the z-directional position. The zero position of the z-directional position is a position which is the center position between the first end 24a and the second end 24c of the outer peripheral surface 24d of the rotating plate 22 (on the orthogonal plane 25) as illustrated in FIG. 4(c) in which positive direction is a direction to approach the first end 24a and negative direction is a direction opposite thereto.

In the graph illustrated in FIG. 4(a), a curve I drawn by solid line indicates change in the r-directional position of the rotating plate 22, and a curve II by dotted line indicates change in the z-directional position of the rotating plate 22. The curve I also defines the shape of the outer peripheral surface of the oblique edge portions 24(1), 24(2) of the rotating plate 22 when viewed from the direction along the rotation centerline 22a (refer to FIG. 3(b)). The curve II defines the inclined shape in a curved fashion of the outer peripheral surface 24d between the first end 24a and the second end 24c of the oblique edge portions 24(1), 24(2) when viewed from the direction along the orthogonal plane 25 (refer to FIG. 3(c)). These curves I and II are a sine curve or a curve similar thereto.

Figure 5:
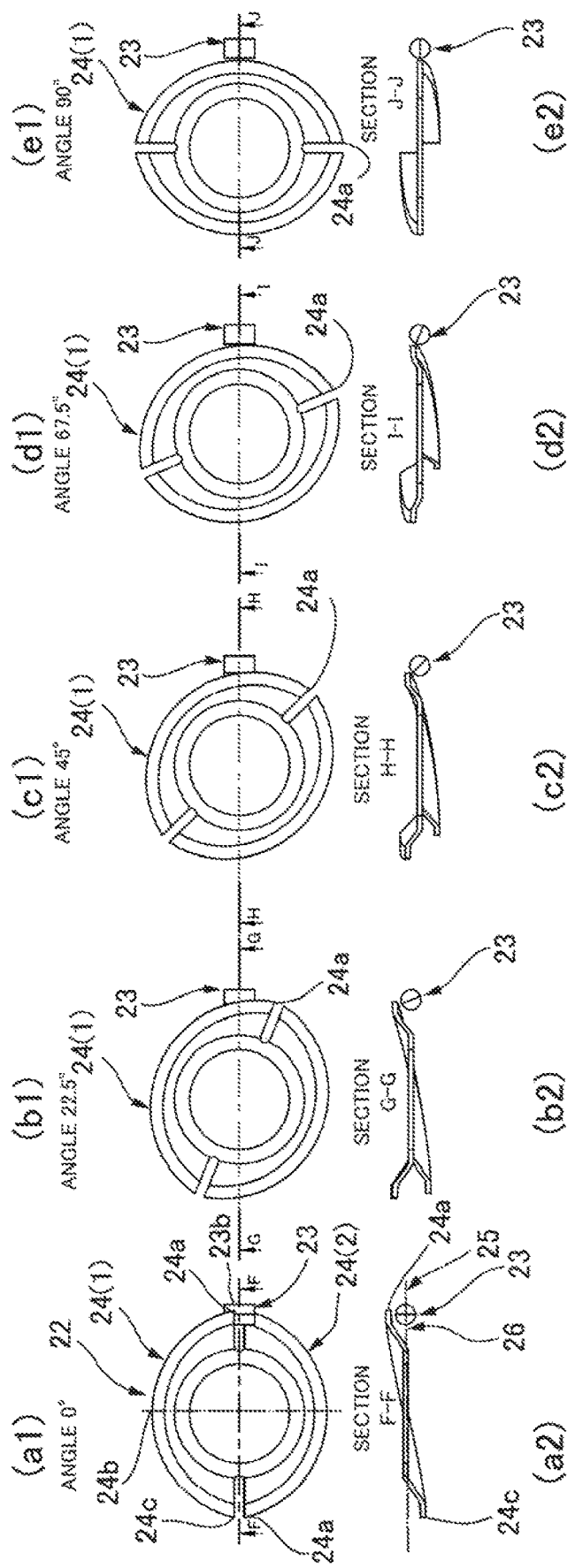
FIG. 5 includes explanatory views illustrating rotational states of a rotating plate and a cylindrical magnet in Embodiment 2.

FIGS. 5(a1), (a2) to FIGS. 5(e1), 5(e2) are explanatory views illustrating moving positions of the oblique edge portions 24(1), 24(2) and rotational positions of the cylindrical magnet 23 in accordance with rotation of the rotating plate 22. As shown in these drawings, the position of the oblique edge portions 24(1), 24(2) passing through the magnet facing area 26 draws a locus in a curved shape along the outer peripheral surface 23b of the cylindrical magnet while substantially maintaining a constant gap with respect to the outer peripheral surface 23b thereof.

In this example, when the rotational angle is zero as illustrated in FIGS. 5(a1) and 5(a2), the cylindrical magnet 23 comes into a state being sandwiched between the oblique edge portions 24(1) and 24(2). From this state, the oblique edge portions 24(1), 24(2) pass through the magnet facing area 26 and move along the outer peripheral surface 23b of the cylindrical magnet 23, and therefore do not interfere with the cylindrical magnet 23.

According to the present embodiment, the position of the oblique edge portions 24(1), 24(2) passing through the magnet facing area 26 moves in a curved fashion along the outer peripheral surface 23b of the cylindrical magnet 23 while substantially maintaining a constant gap. The cylindrical magnet 23 is disposed so that more than half portion thereof is located within the maximum diameter of the rotating plate 22, whereby making the gap small. Accordingly, it is possible to extract rotation of the rotating plate 22 out to the cylindrical magnet 23 by making use of magnet attractive force effectively. In addition, the installation space for the cylindrical magnet 23 is small, which is advantageous for the mechanism to be made small and compact.

Embodiment 3

Figure 6:
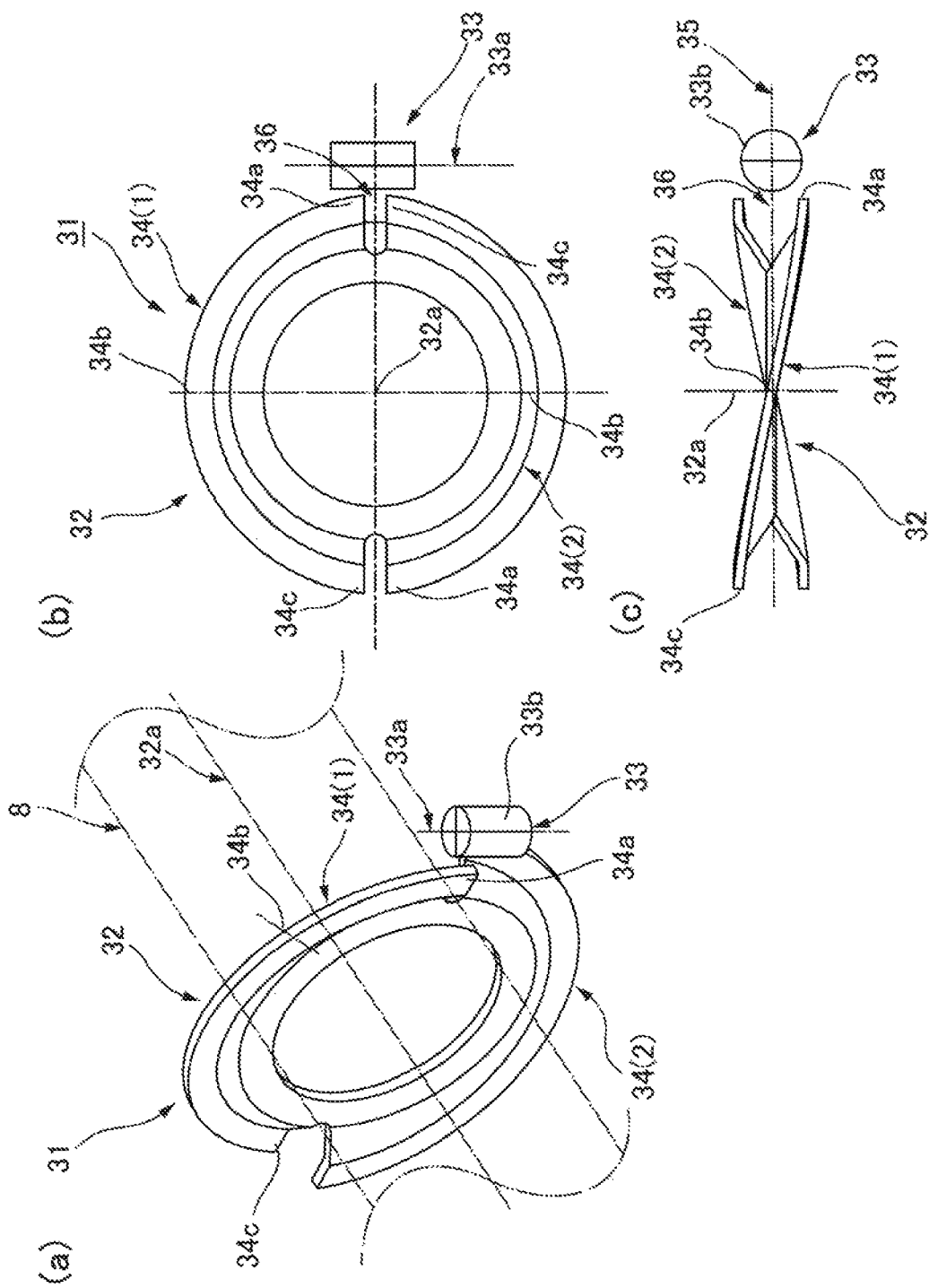
FIG. 6 includes a perspective view, a front view and a side view, illustrating a magnetic type rotation transmitting mechanism according to Embodiment 3 of the present invention.

FIG. 6 includes a perspective view, a front view and a side view, illustrating main portions of a magnetic type rotation transmitting mechanism according to Embodiment 3. The magnetic type rotation transmitting mechanism 31 has the same basic configuration as that of the magnetic type rotation transmitting mechanism 21 of Embodiment 2.

The magnetic type rotation transmitting mechanism 31 is configured so that the position of oblique edge portions 34(1) and 34(2) passing through a magnet facing area 36 draws a moving locus in a curved fashion in accordance with rotation of a rotating plate 32. The moving locus extends in the direction of the rotation centerline 32a along the outer peripheral surface 33b of a cylindrical magnet 33.

Each of the oblique edge portions 34(1), 34(2) is inclined in a curved fashion from the first end 34a to the second end 34c thereof when viewed from the direction along an orthogonal plane 35. The first end 34a is located at one side of the orthogonal plane 35 and is apart from the plane toward the one side by a constant distance, while the second end 34c is located at the other side of the orthogonal plane 35 and is apart from the plane toward the second side by the same distance. The midpoint 34b between the first end 34a and the second end 34c is located on the orthogonal plane 35.

The shape of the outer peripheral surface of the oblique edge portions 34(1), 34(2) is defined by a curve having a radius centered on the rotation centerline 32a, the radius decreasing from the first end 34a to the midpoint 34b and increasing from the midpoint 34b to the second end 34c.

In Embodiment 3, the cylindrical magnet 33 in Embodiment 3 is magnetized to have four poles so that two pairs of magnetic poles are formed at equiangular intervals about the center axis line 33a. The magnetic pole boundaries are formed at an angular interval of 90 degrees on the outer peripheral surface 33b about the center axis line 33a. Corresponding to this, the amount of movement by which the position of the oblique edge portions 34(1), 34(2) passing through the magnet facing area 36 moves in the direction of the rotation centerline 32a, is determined.

Figure 7:
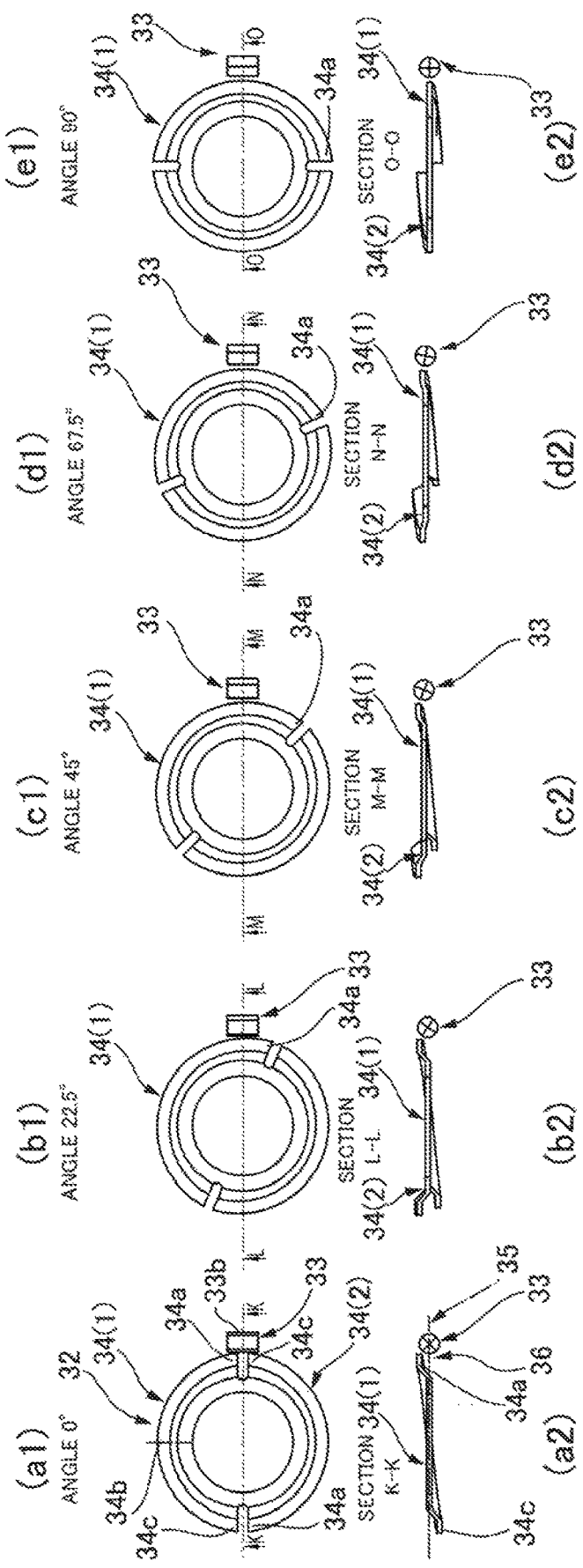
FIG. 7 includes explanatory views illustrating rotational states of a rotating plate and a cylindrical magnet in Embodiment 3.

FIGS. 7(a1), (a2) to FIGS. 7(e1), (e2) are explanatory views illustrating moving positions of the oblique edge portions 34(1), 34(2) and rotational positions of the cylindrical magnet 33 in accordance with rotation of the rotating plate 32. As illustrated in these drawings, the position of the oblique edge portions 34(1), 34(2) passing through the magnet facing area 36 draws a locus of a curved shape along the outer peripheral surface 33b of the cylindrical magnet 33 while substantially maintaining a constant gap between the position of the oblique edge portions and the outer peripheral surface 33b of the magnet.

Because the cylindrical magnet 33 is magnetized to have four magnetic poles about the center axis line 33a, the cylindrical magnet 33 is rotated by an amount of one magnetic pole, namely, ¼ rotation each time the oblique edge portions 34(1), 34(2) pass through the magnet facing area 36. During one rotation of the rotating plate 32, the cylindrical magnet 33 makes a half rotation. Accordingly, the rotation of the rotating plate 32 is reduced in speed at a ratio of ½ and is extracted from the cylindrical magnet 33.

Embodiment 4

Figure 8:
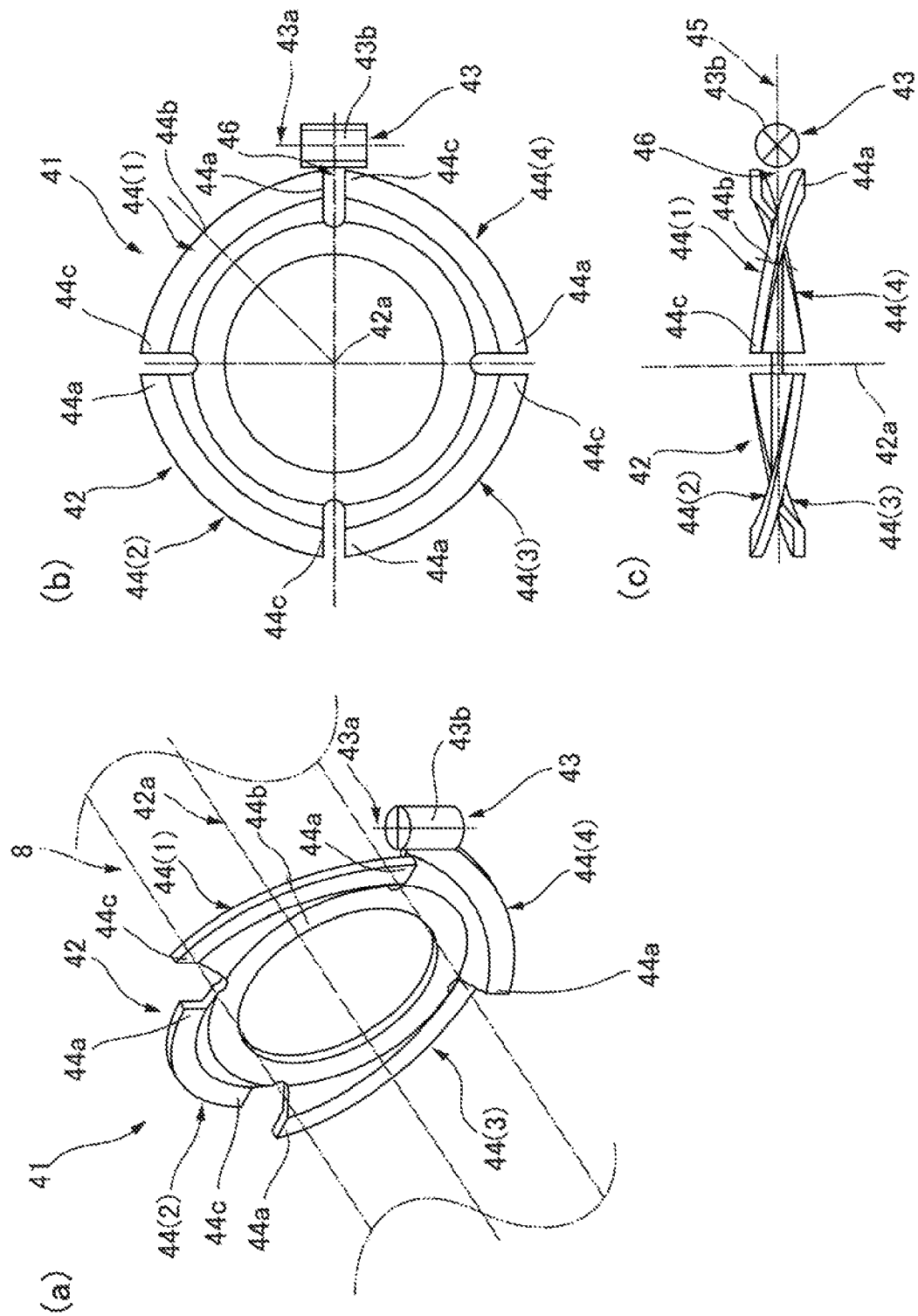
FIG. 8 includes a perspective view, a front view and a side view, illustrating a magnetic type rotation transmitting mechanism according to Embodiment 4 of the present invention.

FIG. 8 includes a perspective view, a front view and a side view, illustrating main portions of a magnetic type rotation transmitting mechanism according to Embodiment 4. The magnetic type rotation transmitting mechanism 41 has the same basic configuration as that of the magnetic type rotation transmitting mechanism 31 of Embodiment 3. The different points are those in that a rotating plate 42 is formed with four oblique edge portions 44(1) to 44(4).

The magnetic type rotation transmitting mechanism 41 is configured so that the position of the oblique edge portions 44(1) to 44(4) passing through a magnet facing area 46 draws a moving locus in a curved fashion in accordance with rotation of the rotating plate 42, the moving locus extending toward the direction of a rotation centerline 42a along the outer peripheral surface 43b of a cylindrical magnet 43.

Each of the oblique edge portions 44(1) to 44(4) is inclined in a curved fashion from the first end 44a to the second end 44c thereof when viewed from the direction along an orthogonal plane 45. The first end 44a is located at one side of the orthogonal plane 45 and is apart from the plane toward the one side by a constant distance, while the second end 44c is located at the other side of the orthogonal plane 45 and is apart from the plane toward the second side by the same distance. The midpoint 44b between the first end 44a and the second end 44c is located on the orthogonal plane 45.

The shape of the outer peripheral surface of the oblique edge portions 44(1) to 44(4) is defined by a curve having a radius centered on the rotation centerline 42a, the radius decreasing from the first end 44a to the midpoint 44b and increasing from the midpoint 44b to the second end 44c.

The cylindrical magnet 43 is magnetized to have four poles so that two pairs of magnetic poles are formed at equiangular intervals about the center axis line 43a. Corresponding to this, the amount of movement by which the position of the oblique edge portions 44(1) to 44(4) passing through the magnet facing area 46 moves in the direction of the rotation centerline 42a, is determined.

Figure 9:
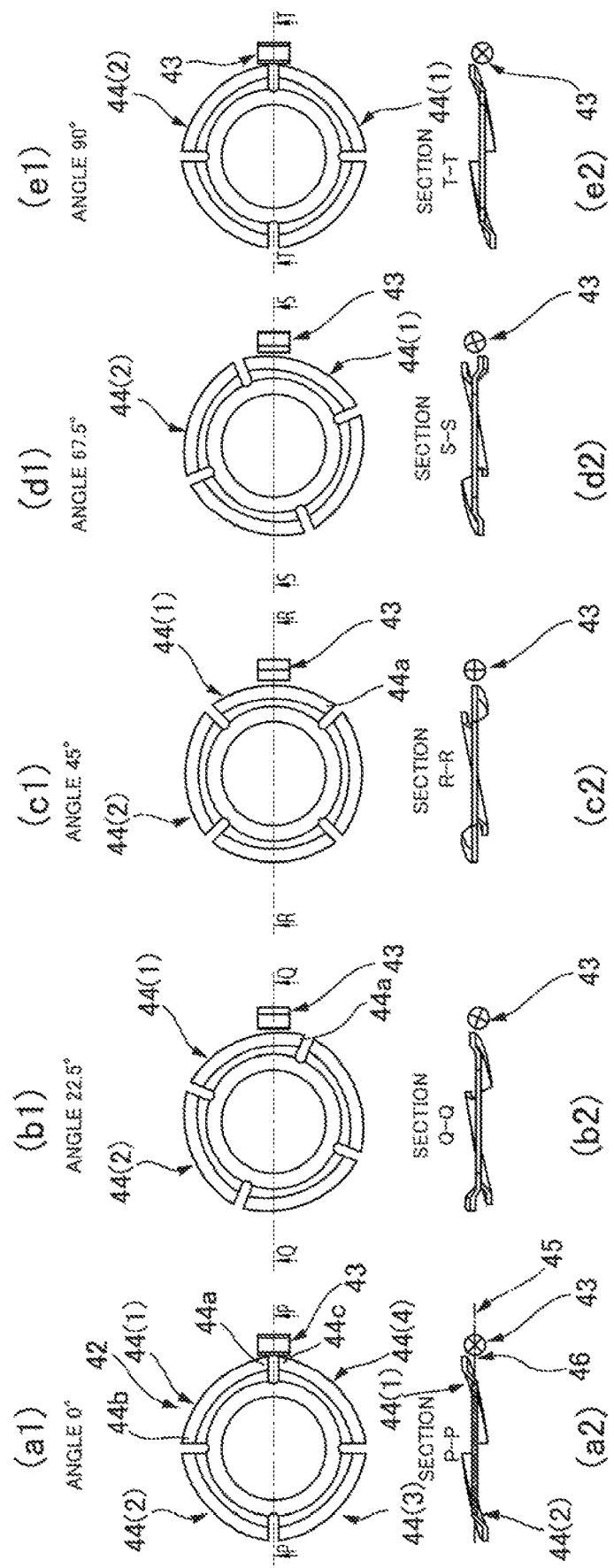
FIG. 9 includes explanatory views illustrating rotational states of a rotating plate and a cylindrical magnet in Embodiment 4.

FIGS. 9(a1), (a2) to FIGS. 9(e1), (e2) are explanatory views illustrating moving positions of the oblique edge portions 44(1) to 44(4) and rotational positions of the cylindrical magnet 43 in accordance with rotation of the rotating plate 42. As shown in these drawings, the position of the oblique edge portions 44(1) to 44(4) passing through the magnet facing area 46 draws a locus of a curved shape along the outer peripheral surface 43b of the cylindrical magnet 43 while substantially maintaining a constant gap between the position of the oblique edge portions and the outer peripheral surface 43b of the magnet.

The rotating plate 42 is formed with four oblique edge portions 44(1) to 44(4) and the cylindrical magnet 43 is magnetized to have four magnetic poles. The cylindrical magnet 43 is rotated by an amount of ¼ rotation each time the oblique edge portions 44(1) to 44(4) pass through the magnet facing area 46. During one rotation of the rotating plate 42, the cylindrical magnet 43 also makes one rotation. Accordingly, the rotation of the rotating plate 42 is extracted from the cylindrical magnet 43 at a rotational speed ratio of 1:1.

Embodiment 5

Figure 10:
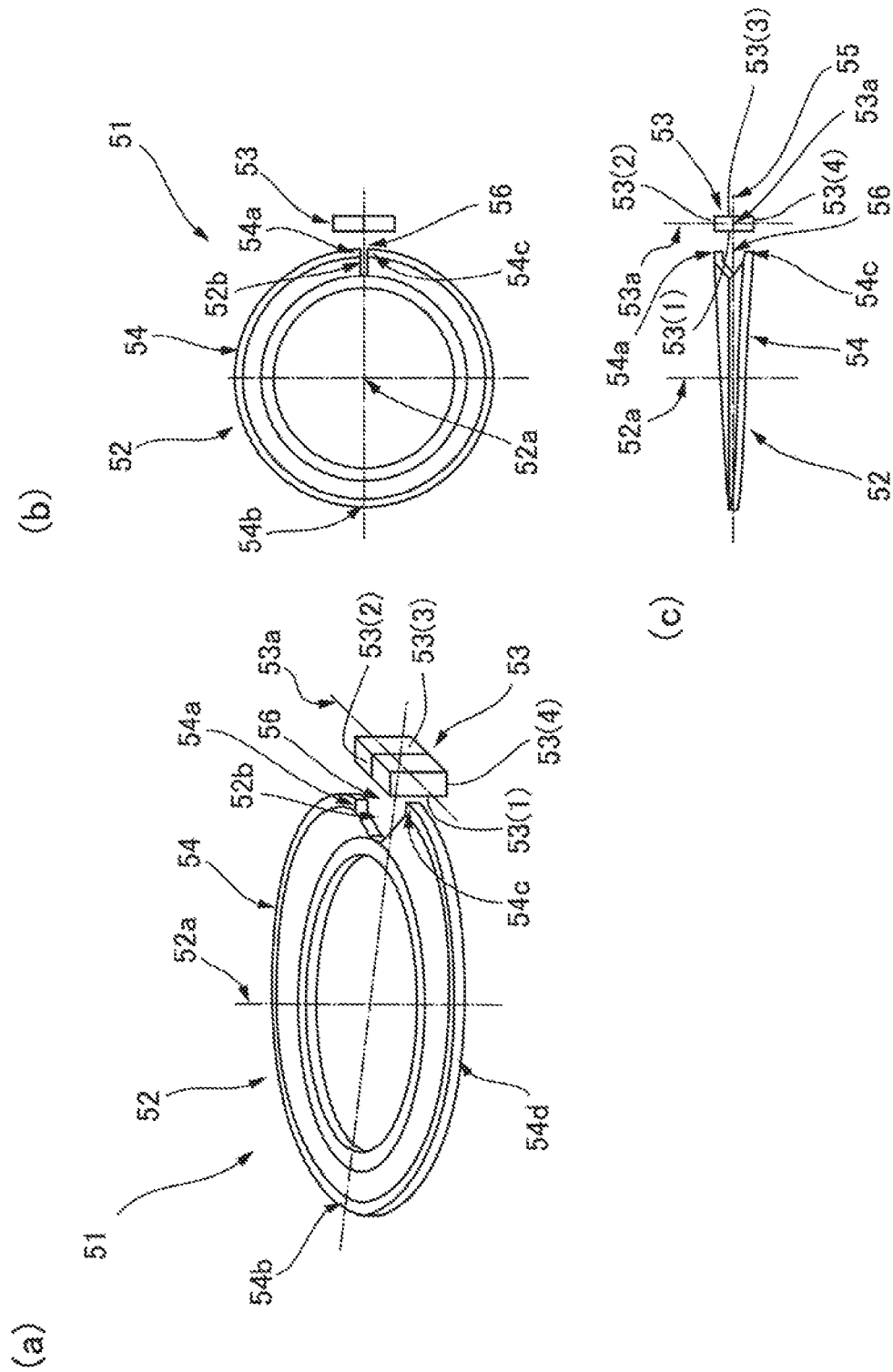
FIG. 10 includes a perspective view, a front view and a side view, illustrating a magnetic type rotation transmitting mechanism according to Embodiment 5 of the present invention.

FIG. 10 includes a perspective view, a front view, and a side view, illustrating main portions of a magnetic type rotation transmitting mechanism according to Embodiment 5. The magnetic type rotation transmitting mechanism 51 has a toroidal rotating plate 52 made of a magnetic material and a flat plate magnet 53 having a fixed length. The rotating plate 52 is coaxially fixed, for example, to a hollow motor shaft so as to rotate integrally therewith, the hollow motor shaft being not shown in the drawing. The rotating plate 52 rotates about a center axis line thereof which is a rotation centerline 52a. The rotational motion of the rotating plate 52 is transmitted to the plate magnet 53 at a speed ratio of 1:1, via a magnetic coupling.

The rotating plate 52, which is, for example, a sheet metal product, is formed on the outer peripheral edge with one oblique edge portion 54 extending through the entire periphery thereof. In this embodiment, the oblique edge portion 54 is separated in the circumferential direction by one separation groove 52b that cuts the rotating plate 52 from the outer peripheral surface toward radially and inwardly with a constant width.

A plane is referred to as an orthogonal plane 55 which is orthogonal to the rotation centerline 52a and passes through the center position of the rotating plate 52 in the direction of the rotation centerline 52a (in the thickness direction of the rotating plate 52). The oblique edge portion 54 is inclined in a curved fashion when viewed from the direction along the orthogonal plane 55.

Specifically, as can be seen from FIG. 10(c), the oblique edge portion 54 has a first end 54a and a second end 54c that are separated by the separation groove 52b, in which the first end 54a is located at one side of the orthogonal plane 55 and is apart from the plane toward the one side by a constant distance, the other second end 54c is located at the other side of the orthogonal plane 55 and is apart from the plane toward the other side by the same distance, and a midpoint 54b between these ends is located on the orthogonal plane 55.

The oblique edge portion 54 has an outer peripheral surface 54d, the contour shape of which is defined by a true circle centered on a rotation centerline 52a when viewed from the direction along the rotation centerline 52a.

The plate magnet 53 is supported so that it can rotate about the center axis line 53a thereof. The bearing portions of the plate magnet 53 are omitted from the drawing. The plate magnet 53 is formed with a pair of magnetic poles arranged in the direction of the center axis line 53a thereof. The magnet has four outer side surfaces 53(1) to 53(4), on which magnetic pole boundaries are respectively formed at the center position in the direction of the center axis line 53a. Solid lines drawn on the four outer side surfaces 53(1) to 53(4) of the plate magnet 53 in FIG. 10 indicate the boundaries between an N pole and an S pole. It is noted that the drawn boundary lines do not actually appear.

The plate magnet 53 is disposed at a position facing the passage route of the oblique edge portion 54 with a prescribed gap so as not to interfere with the passage route, the passage route being that of the oblique edge portion 54 in accordance with rotation of the rotating plate 52. Specifically, the plate magnet 53 is disposed at a fixed position in the circumferential direction of the rotating plate 52, the position being located radially outside of the rotating plate 52. The center axis line 53a of the rotating plate is located on the orthogonal plane 55. Accordingly, the oblique edge portion 54 of the rotating plate 52 moves to pass through the magnet facing area 56 in accordance with rotation of the rotating plate 52, the magnet facing area being in which the oblique edge portion faces the plate magnet 53 with a prescribed gap.

Figure 11:
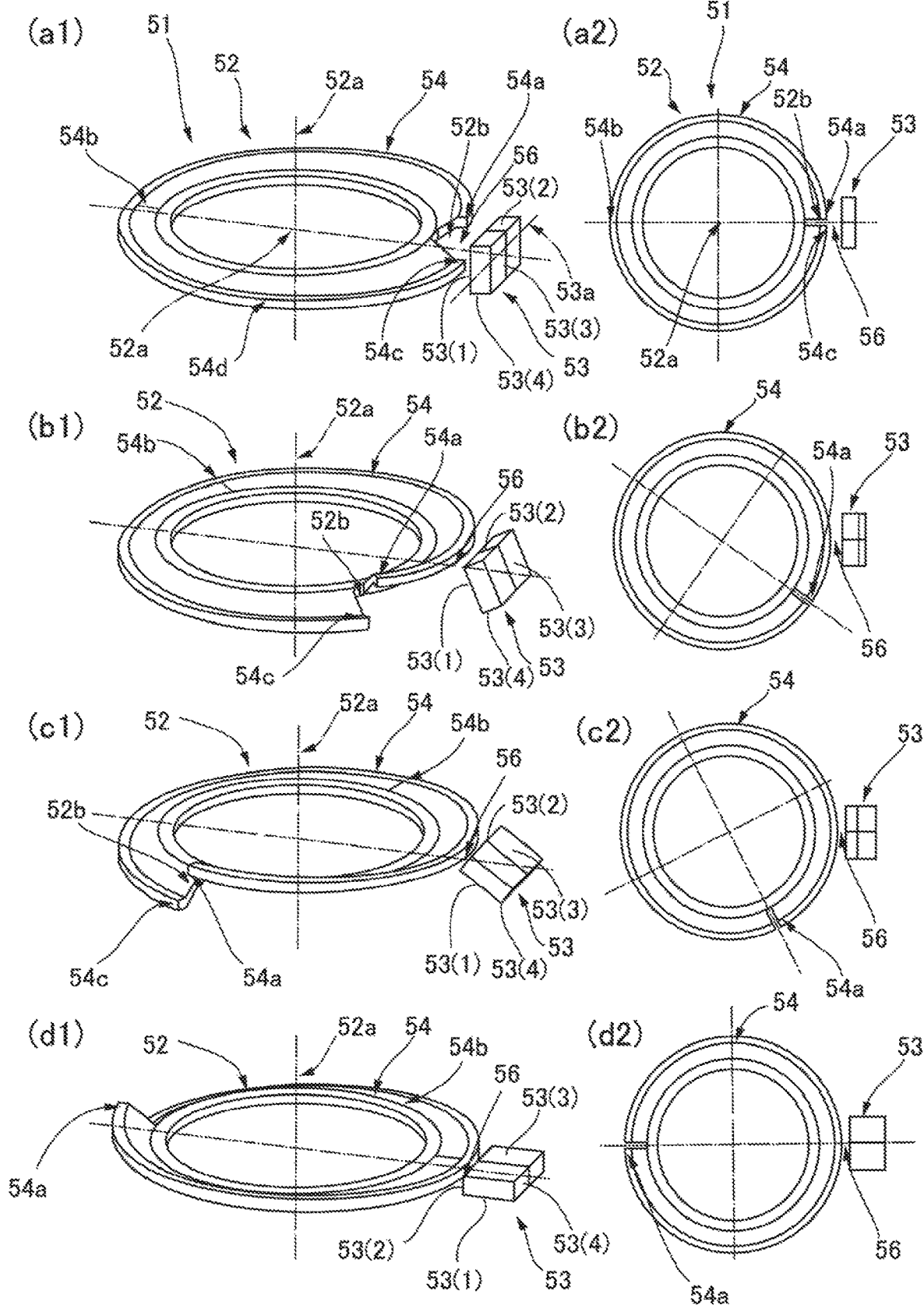
FIG. 11 includes explanatory views illustrating rotational states of a rotating plate and a cylindrical magnet in Embodiment 5.

FIG. 11 includes explanatory views illustrating rotational positions of the oblique edge portion 54 and the plate magnet 53 in accordance with rotation of the rotating plate 52. The rotational position of the rotating plate 52 illustrated in FIGS. 11(a1) and 11(a2) is a position where the rotational angle is zero. From this position, the rotational plate 52 rotates clockwise. At the position where the rotational angle is zero, the first and second ends 54a and 54c are located within the magnet facing area 56 in a state in which the wide outer peripheral side surface 53(1) of the plate magnet 53 exactly faces the rotating plate 52.

The oblique edge portion 54 has an outer peripheral surface 54d defined by a true circle centered on the rotation centerline 52a. As illustrated in FIGS. 11(b1), 11(b2), FIGS. 11(c1), 11(c2), and FIGS. 11(d1), 11(d2), when the rotating plate 52 rotates, the oblique edge portion 54 of the rotating plate passes through the magnet facing area 56 in a state in which the oblique edge portion 54 faces the plate magnet 53 with a prescribed gap.

The oblique edge portion 54 of the rotating plate 52 is inclined in a curved fashion in the direction of the rotation centerline 52a with respect to the center axis line 53a of the plate magnet 53. Accordingly, as illustrated in FIG. 11, the position of the oblique edge portion 54 passing through the magnet facing area 56 moves in the direction of the rotation centerline 52a of the rotating plate 52 in accordance with rotation of the rotating plate 52.

In the illustrated example, the first end 54a of the oblique edge portion 54 is located at a first side which is the upper side of drawing with respect to the center axis line 53a of the plate magnet 53, while the second end 54c is located at a second side which is the lower side in the direction of the center axis line 53a. At the position in which the rotational angle is zero illustrated in FIGS. 11(a1), 11(a2), the plate magnet 53 is located so that the wide outer peripheral side surface 53(1) thereof exactly faces the rotating plate 52.

In accordance with clockwise rotation of the rotating plate 52, the position of the oblique edge portion 54 passing through the magnet facing area 56 gradually moves form the first side to the second side. In accordance with this movement, the center of magnetic coupling force, which is generated between the rotating plate 52 and the plate magnet 53, also moves from the first side toward the second side. This causes the plate magnet 53 to rotate about the center axis line 53a toward the direction (counterclockwise direction) so that the outer peripheral side surface 53(1) comes to face the second side. As illustrated in FIGS. 11(b1), (b2), FIGS. 11(c1), (c2), and FIGS. 11(d1), (d2), the plate magnet 53 rotates about the center axis line 53a thereof.

In a state in which the rotating plate 52 rotates by an angle of 180 degrees, the position of the oblique edge portion 54 passing through the magnet facing area 56 is exactly located on the orthogonal plane 55. In this state, the plate magnet 53 becomes a state in which it is rotated by 90 degrees and a narrow outer peripheral side surface 53(2) adjacent to the wide outer peripheral side surface 53(1) exactly faces the rotating plate 52, as illustrated in FIGS. 11(d1), 11(d2).

Thereafter, the position of the oblique edge portion 54 passing through the magnet facing area 56 gradually moves toward the second side with respect to the orthogonal plane 55 in accordance with rotation of the rotating plate 52. This causes the plate magnet 53 to rotate further in the same direction about the center axis line 53a. When the rotating plate 52 rotates once, the plate magnet 53 rotates by 180 degrees to come into a state in which a wide outer peripheral side surface 53(3) adjacent to the narrow outer peripheral side surface 53(2) exactly face the rotating plate 52.

When the rotating plate 52 rotates twice, the plate magnet 53 rotates once to return to the state as illustrated in FIGS. 11(a1), 11(a2). In this way, the rotation of the rotating plate 52 is reduced at a speed ratio of ½ and is extracted from the plate magnet 53.

Embodiment 6

Figure 12:
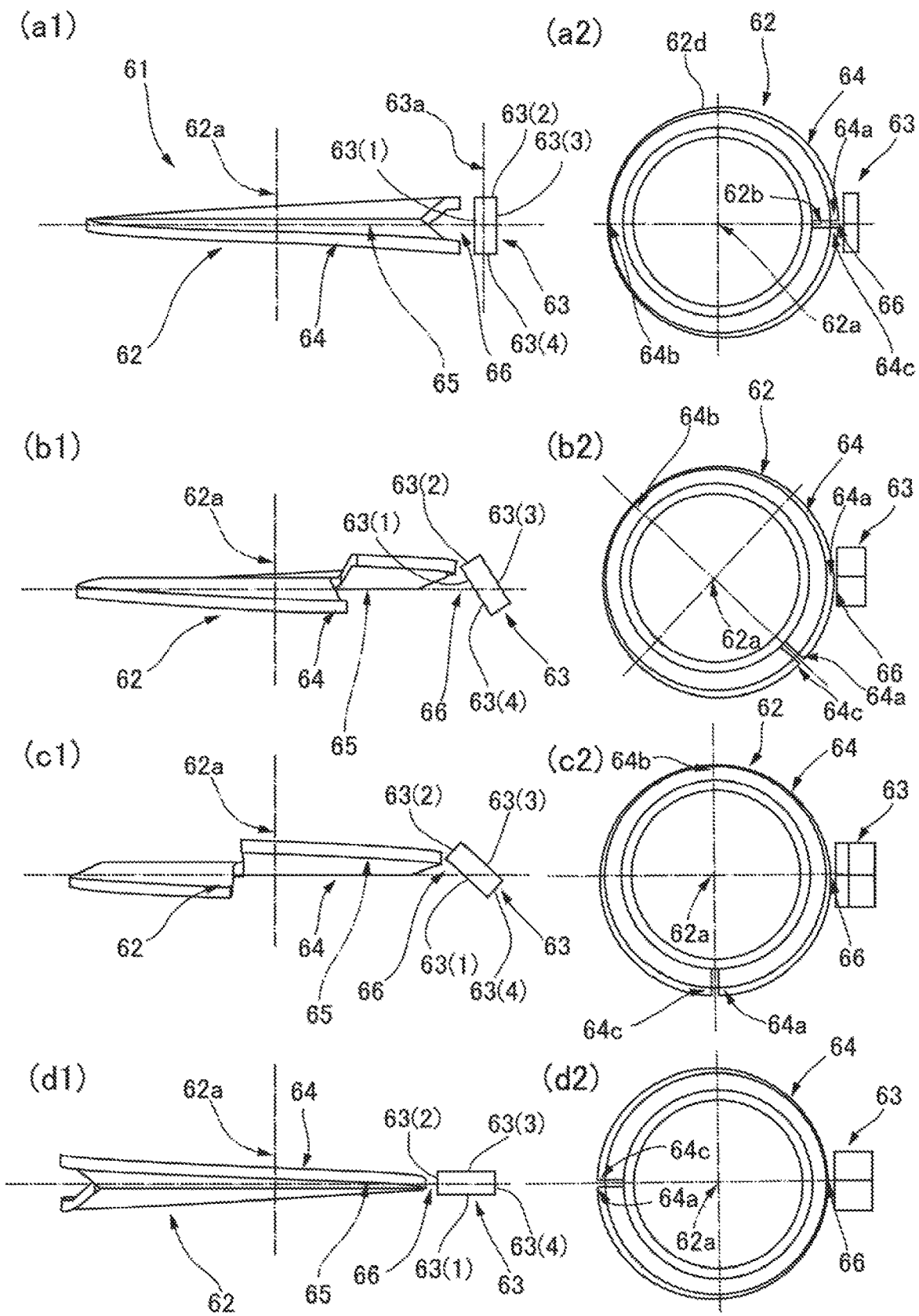
FIG. 12 includes a side view and a front view, illustrating a magnetic type rotation transmitting mechanism according to Embodiment 6 of the present invention, in which rotational states of a rotating plate and a magnet are illustrated.

FIGS. 12(*a*1) and 12(*a*2), FIGS. 12(*b*1) and 12(*b*2), FIGS. 12(*c*1) and 12(*c*2), and FIGS. 12(*d*1) and 12(*d*2) are side views and front views illustrating main portions of a magnetic type rotation transmitting mechanism according to Embodiment 6, in which rotational states of an oblique edge portion and a plate magnet in accordance with rotation of a rotating plate are illustrated.

The magnetic type rotation transmitting mechanism 61 has the same basic configuration as that of the magnetic type rotation transmitting mechanism 51 of Embodiment 5. In this embodiment, the outer peripheral surface 62*d* of a rotating plate 62 has a shape defined, for example, by a true circle centered on a position offset from a rotation centerline 62*a*.

FIGS. 12(*a*1), 12(*a*2) illustrate the rotating plate 62 at a rotational position where the rotational angle thereof is zero. From this position, the rotating plate 62 rotates clockwise. At the position where the rotational angle is zero, an oblique edge portion 64 of the rotating plate 62 has a first and second ends 64*a* and 64*c* located on an orthogonal plane 65. In this position, the plate magnet 63 has a wide outer peripheral side surface 63(1) that exactly faces the rotating plate 62. Similar to the case of Embodiment 5, when the rotating plate 62 rotates twice, the plate magnet 63 rotates once to return to the state as illustrated in FIGS. 12(*a*1) and 12(*a*2). The rotation of the rotating plate 62 is reduced at a speed ratio of ½ and is extracted from the plate magnet 63.

The rotating plate 62 is an eccentric rotating plate. At the rotational position where the rotational angle is zero, the first and second ends 64*a* and 64*c* of the outer peripheral surface of the oblique edge portion 64 are located in a magnet facing area 66 and is in a state being closest to the center axis line 63*a* of the rotating plate 63. A wide outer peripheral side surface 63(1) of the plate magnet 63, which faces exactly the rotating plate 62, is in a state being furthest away from the rotation centerline 62*a* of the rotating plate 62.

At the rotational position where the rotational angle is 90 degrees, a midpoint 64*b* of the oblique edge portion 64 is located in the magnet facing area 66 and is in a state being furthest away from the center axis line 63*a* of the plate magnet 63. A narrow outer peripheral side surface 63(2) of the plate magnet 63, which faces exactly the rotating plate 62, is in a state being closest to the rotating centerline 62*a* of the rotating plate 62.

In this way, when the rotating plate 62 comes close to the plate magnet 63 in accordance with rotation of the rotating plate 62, the plate magnet 63 moves in the direction away from the rotating plate. Conversely, when the rotating plate 62 moves away from the plate magnet 63, the plate magnet 63 moves in the direction approaching the rotating plate. For example, the amount of eccentricity of the outer peripheral surface of the rotating plate 62 is appropriately determined based on the width dimensions of the respective outer peripheral side surfaces of the plate magnet 63, so that a gap between the oblique edge portion 64 of the rotating plate 62 and the respective outer peripheral side surfaces 63(1) to 63(4) of the plate magnet 63 can be kept substantially constant in the magnet facing area 66.

The invention claimed is:

1. A magnetic type rotation transmitting mechanism comprising:
   a disc-shaped or toroidal-shaped rotating plate made of a magnetic material; and
   a magnet to which rotational movement of the rotating plate is transmitted through a magnetic coupling between the magnet and the rotating plate,
   wherein
   the rotating plate has an outer peripheral edge part, the outer peripheral edge part being provided with an oblique edge portion separated at one place in a circumferential direction, or a plurality of oblique edge portions separated at equiangular intervals in the circumferential direction;
   the magnet is located at a position in an area including a passage route along which the oblique edge portion moves in accordance with rotation of the rotating plate, the position being at which the magnet faces the oblique edge portion with a prescribed gap;
   the oblique edge portion is inclined from a first end to the other second end thereof in the circumferential direction with respect to a direction of a rotation centerline of the rotating plate;
   where an orthogonal plane is a plane which is orthogonal to the rotation centerline and which passes through a center between the first and second ends of the oblique edge portion when viewed along a direction of the rotation centerline,
   the magnet is disposed to rotate about a center axis line located on the orthogonal plane; and
   the magnet is either formed with a plurality of magnetic poles along a circumferential direction about the center axis line thereof or formed with a plurality of magnetic poles along the direction of the center axis line thereof.

2. The magnetic type rotation transmitting mechanism according to claim 1,
   wherein the oblique edge portion is inclined in a linear or curved fashion from the first end to the second end when viewed from a direction along the orthogonal plane.

3. The magnetic type rotation transmitting mechanism according to claim 2,
   wherein an outer peripheral surface of the oblique edge portion has a shape from the first end to the second end, the shape being defined by a circular arc centered on the rotation centerline.

4. The magnetic type rotation transmitting mechanism according to claim 2,
   wherein the magnet is a plate magnet formed with a pair of magnets in the direction of the center axis line; and
   the oblique edge portion has a shape of an outer peripheral surface thereof, the shape being defined by a true circle centered on a position eccentric by a predetermined amount with respect to the rotation centerline.

5. The magnetic type rotation transmitting mechanism according to claim 1,
   wherein the magnet is a cylindrical magnet formed with a plurality of magnetic poles in the circumferential direction about the center axis line; and
   the oblique edge portion has an inclined shape inclined in a direction of the rotation centerline and an outer-peripheral-surface shape,
   the inclined shape and the outer-peripheral-surface shape being determined so that a position of the oblique edge portion passing through an area in which the oblique edge portion faces the cylindrical magnet passes in a curved fashion along an outer peripheral surface of the cylindrical magnet toward a direction of the rotation centerline.

6. The magnetic type rotation transmitting mechanism according to claim 5, wherein the oblique edge portion is inclined in a curved fashion from the first end to the second end when viewed from a direction along the orthogonal plane; and the outer-peripheral-surface shape of the oblique edge portion is defined by a curve having a radius centered on the rotation centerline, the radius being decreased from the first end to a midpoint located on the orthogonal plane and being increased from the midpoint to the second end.

7. The magnetic type rotation transmitting mechanism according to claim 6, wherein the cylindrical magnet has an outer diameter dimension so that it can be disposed between the first end and the second end of the oblique edge portion; and at least a part of the cylindrical magnet is disposed within a maximum outer diameter dimension of the rotating plate.

\* \* \* \* \*